US012365595B2

(12) United States Patent
Dobree et al.

(10) Patent No.: US 12,365,595 B2
(45) Date of Patent: Jul. 22, 2025

(54) METHOD AND PLANT FOR THE PRODUCTION OF AMMONIA WITH RENEWABLE ENERGY

(71) Applicant: STAMICARBON B.V., Sittard (NL)

(72) Inventors: Joey Dobree, Maastricht (NL); Mahal Patel, Sittard (NL); Paolo Mazzara, Rome (IT)

(73) Assignee: STAMICARBON B.V., Sittard (NL)

( * ) Notice: Subject to any disclaimer, the term of this patent is extended or adjusted under 35 U.S.C. 154(b) by 0 days.

(21) Appl. No.: 18/729,381

(22) PCT Filed: Sep. 12, 2023

(86) PCT No.: PCT/NL2023/050469
§ 371 (c)(1),
(2) Date: Jul. 16, 2024

(87) PCT Pub. No.: WO2024/058660
PCT Pub. Date: Mar. 21, 2024

(65) Prior Publication Data
US 2025/0002360 A1    Jan. 2, 2025

(30) Foreign Application Priority Data
Sep. 12, 2022  (EP) ..................................... 22195074

(51) Int. Cl.
*C01C 1/04* (2006.01)
*C25B 1/04* (2021.01)
*F01D 15/10* (2006.01)

(52) U.S. Cl.
CPC ............ *C01C 1/0482* (2013.01); *F01D 15/10* (2013.01); *C25B 1/04* (2013.01); *F25J 2260/42* (2013.01)

(58) Field of Classification Search
None
See application file for complete search history.

(56) References Cited

U.S. PATENT DOCUMENTS

| 2017/0022897 A1* | 1/2017 | Alekseev | F25J 1/0201 |
| 2020/0148547 A1 | 5/2020 | Papile | |
| 2021/0340017 A1* | 11/2021 | Fujimoto | C01C 1/0494 |
| 2022/0285938 A1* | 9/2022 | Mehta | H02J 3/381 |

FOREIGN PATENT DOCUMENTS

| CN | 112179046 A | | 1/2021 | |
| CN | 114777413 A | * | 7/2022 | ......... C01B 13/0248 |
| WO | 2020035521 A1 | | 2/2020 | |

OTHER PUBLICATIONS

English translation of CN-114777413-A Description (Year: 2022).*
International Search Report for International Application No. PCT/NL2023/050469, dated Nov. 20, 2023 (4 pages).

* cited by examiner

*Primary Examiner* — Anthony J Zimmer
*Assistant Examiner* — Zachary John Baum
(74) *Attorney, Agent, or Firm* — Leason Ellis LLP (57) ABSTRACT

The disclosure pertains to a plant for the production of ammonia. The ammonia is produced from hydrogen obtained by electrolysis of water. The electrolysis is powered by a renewable source of energy, complemented with power obtained from the plant during periods of low or no availability of the renewable energy. To this end, the plant is configured such that it can be operated in a charge configuration (obtaining and storing power) and a discharge configuration (employing said power).

15 Claims, 5 Drawing Sheets

METHOD AND PLANT FOR THE PRODUCTION OF AMMONIA WITH RENEWABLE ENERGY

CROSS-REFERENCE TO RELATED PATENT APPLICATIONS

This application is a U.S. National Stage Application under 35 U.S.C. § 371 of International Patent Application No. PCT/NL2023/050469, filed Sep. 12, 2023, which claims the benefit of priority of European Patent Application number 22195074.4, filed Sep. 12, 2022, both of which are incorporated by reference in their entireties.

FIELD

The invention is in the field of green ammonia production technology. Particularly, the invention pertains to a method and a plant for the production of ammonia wherein renewable sources of energy can be used. The invention further concerns a method of modifying a pre-existing ammonia plant.

INTRODUCTION

Today's challenges in the chemical industry include making a transition to avoid using fossil fuels, and employing renewable energy. Ammonia is considered one of the key chemicals in such transition. One reason is that, as such, it can serve as a source of hydrogen, e.g., in fuel cells. Another reason is that, being an inorganic chemical, it does not require carbon to be produced.

The most widely used industry process for producing ammonia, the Haber-Bosch process, involves the catalytic reaction of hydrogen and nitrogen. It has been customary to obtain the hydrogen from natural gas, but in today's desired carbon-free chemistry, the hydrogen is obtained by the electrolysis of water. The latter requires energy, which in a "green" ammonia process desirably is provided by renewable energy sources.

A general issue with renewable energy sources, is presented by the inherent fluctuations in its supply. Renewable energy sources generally exhibit both primary and secondary fluctuations. Primary fluctuations in solar energy, for example, are due to the day/night cycle. On shorter timescales such as hours to minutes secondary fluctuations may arise from changes in conditions such as wind speed and cloud coverage.

Fluctuations in the renewable energy supply raise issues for the operation of a plant producing green ammonia. If the rate of ammonia production is reduced during periods of low energy supply, temperatures within the plant may vary inducing thermal stresses or shocks. The lifetime of the ammonia converter, including the ammonia producing catalyst, may also be shortened by temperature fluctuations. Thus, it is desirable to minimize these effects by judicious management of the energy supply and of the turndown operating conditions. Continuous or substantially continuous operation is desirable. Such operation generally requires a supplementary energy source when the renewable energy source is unavailable or reduced.

WO 2020/035521 seeks to address this issue for a nitric acid production process, based on burning ammonia. The reference also addresses the production of ammonia, which is integrated with the production of nitric acid. The process recovers heat energy as electricity by the turbo-expansion of a pressurized liquid gas, wherein the liquid gas in turn serves as a reactant supply to the process. Accordingly, in the production of nitric acid liquefied oxygen is used, and in the production of ammonia liquefied nitrogen is used. The heat required for evaporating the pressurized liquid gas prior to expanding it over a turbine, is waste heat generated in the respective nitric acid or ammonia production processes. Hereby, typically, the electrolysis of water to produce hydrogen for the production of ammonia, benefits from the energy storage in the production of nitric acid as integrated therewith.

Employing cryogenic energy storage via a liquefied gas reactant is also known from CN112179046. This reference concerns the production of ammonia, and aims to tune an ammonia production plant to accommodate differences in energy supply. The reference does not address fluctuations in renewable energy supply, but relates to supply of electricity against expensive peak tariffs and reduced off-peak tariffs. Accordingly, a process is disclosed that aims at reducing energy consumption during peak hours by employing energy stored during off-peak hours. This storage is provided by using nitrogen for cryogenic energy storage during off-peak periods, allowing to release such nitrogen to ammonia synthesis during peak periods. This serves to avoid the consumption of costly peak energy to produce nitrogen.

The foregoing references do not serve to optimize, in an ammonia plant as such, the energy supply required for the electrolysis reaction to produce hydrogen, in the event that this is operated as a substantially continuous process, on the basis of energy from a renewable energy source. In this respect, as well as in respect of judicious energy management and reactant supply in general, it is desired to provide a process and plant that is more optimally adapted for the production of green ammonia. Particularly, for such a process if conducted as a substantially continuous process, despite fluctuations in a renewable energy supply.

SUMMARY

In a first aspect, the invention pertains to a plant for the production of ammonia, said plant comprising:
(a) a catalytic reactor having a nitrogen inlet for a nitrogen feed, a hydrogen inlet for a hydrogen feed, and an ammonia outlet for produced ammonia;
(b) an electrolysis unit having a water inlet for a water feed, an oxygen outlet for oxygen, and a hydrogen outlet for hydrogen, said hydrogen outlet being in fluid communication with the hydrogen inlet of the reactor;
(c) a nitrogen providing unit having at least one air inlet for an air stream, an oxygen outlet for an oxygen enriched stream, and a nitrogen outlet for a nitrogen stream; said nitrogen outlet being in fluid communication with the nitrogen inlet of the reactor;
(d) a low pressure air compression and adsorber section, having an air inlet for an external air feed and an air outlet for compressed air, said air outlet being in switchable fluid communication with, optionally, an air inlet of the nitrogen providing unit, and with either an air liquefaction section, or a high pressure air compression unit having an outlet for compressed air in fluid communication with the air liquefaction section, said air liquefaction section comprising a turboexpander configured to drive a generator to provide a first energy source;
(e) a liquid air storage having a liquid air inlet for liquid air obtained from the air liquefaction section, a closable outlet for liquid air in fluid connection with the nitrogen providing unit, and a closable outlet for liquid air in fluid connection with a generator section configured to provide a second energy source and an expanded air stream;

(f) an electrical control unit configured to power the plant; wherein the plant has a power connection with a renewable energy source and with the first and second energy sources, and wherein the electrical control unit is configured to be switchable between the renewable energy source and the first and second energy sources, including combinations thereof.

In a second aspect, the invention provides a process for the production of ammonia, the process being conducted in a plant as described in the preceding paragraph, comprising the steps of:

(i) obtaining nitrogen from the nitrogen providing unit;
(ii) obtaining hydrogen from the electrolysis unit;
(iii) reacting the nitrogen and the hydrogen in the catalytic reactor under ammonia-forming conditions;

the process comprising operating the plant in a charging mode, said charging mode comprising compressing air in the low pressure air compression and adsorber section to provide LP compressed air; compressing the LP compressed air in the high pressure air compression unit to provide HP compressed air, subjecting the HP compressed air to expansion and liquefaction in the turboexpander so as to obtain liquefied air; storing the liquefied air in the liquid air storage; feeding air from the liquid air storage and/or feeding air from the low pressure air compression and adsorber section to the nitrogen providing unit;

wherein the process comprises operating the electrolysis unit with energy from the renewable energy source to provide the hydrogen.

In a further aspect, the invention provides a process for the production of ammonia, the process being conducted in a plant as described in the preceding paragraph, comprising the steps of:

(i) obtaining at least part of the nitrogen from the nitrogen providing unit;
(ii) obtaining at least part of the hydrogen from the electrolysis unit;
(iii) reacting the nitrogen and the hydrogen in the catalytic reactor under ammonia-forming conditions;

the process comprising operating the plant in a discharging mode, said discharging mode comprising compressing air in the low pressure air compression and adsorber section to provide LP compressed air; sending the LP compressed air to the air liquefaction section; subjecting the LP compressed air to expansion and liquefaction in the turboexpander so as to obtain liquefied air; said turboexpander providing a first energy source; storing the liquefied air in the liquid air storage; feeding air from the liquid air storage to the generator section, thereby expanding the air so as to provide a second energy source and expanded air, feeding the nitrogen providing unit with air from either or both of the liquid air storage and the expanded air, wherein the process comprises adapting the operating rate of the nitrogen providing unit, the electrolysis unit, and the catalytic reactor to in accordance with the amount of air available for the nitrogen providing unit, and operating the control unit so as to power the process by the first and second energy sources.

In a still further aspect, the invention concerns a method of modifying a pre-existing plant for the production of ammonia, said pre-existing plant comprising:

a catalytic reactor having a nitrogen inlet for a nitrogen feed, a hydrogen inlet for a hydrogen feed, and an ammonia outlet for produced ammonia;

a hydrogen providing section having a hydrogen outlet for hydrogen, said hydrogen outlet being in fluid communication with the hydrogen inlet of the reactor;

a nitrogen providing unit having at least one air inlet for an air stream, an oxygen outlet for an oxygen enriched stream, and a nitrogen outlet for a nitrogen stream; said nitrogen outlet being in fluid communication with the nitrogen inlet of the reactor;

an electrical control unit configured to power the plant; the method comprising adding to the pre-existing plant:

an electrolysis unit having a water inlet for a water feed, an oxygen outlet for oxygen, and a hydrogen outlet for hydrogen, said hydrogen outlet being in fluid communication with the hydrogen inlet of the reactor;

a low pressure air compression and adsorber section, having an air inlet for an external air feed and an air outlet for LP compressed air, said air outlet being optionally in fluid communication with an air inlet of the nitrogen providing unit and being in switchable fluid communication with either an air liquefaction section, or a high pressure air compression unit having an outlet for compressed air in fluid communication with the air liquefaction section, said air liquefaction section comprising a turboexpander configured to drive a generator to provide a first energy source;

a liquid air storage having a liquid air inlet for liquid air obtained from the air liquefaction section, a closable outlet for liquid air in fluid connection with the nitrogen providing unit, and a closable outlet for liquid air in fluid connection with a generator section configured to provide a second energy source and an expanded air stream; said generator section having an air outlet in fluid connection with an air inlet of the nitrogen providing unit;

and arranging that the plant has a power connection with a renewable energy source and with the first and second energy sources, and configuring the electrical control unit such as to be switchable between the renewable energy source and the first and second energy sources, including combinations thereof.

DETAILED DESCRIPTION

The invention, in a broad sense, concerns an ammonia production plant that is capable of being operated on the basis of sources of renewable energy, by virtue of switching between a charging mode and a discharging mode. Specifically, this is based on the judicious insight of putting to use a storage for liquid air as a tool to accomplish said switching capability. More particularly, the invention also puts to use the insight to combine a liquid air cryogen with heat for expansion drawn from ammonia synthesis.

The plant and process disclosed herein, serve to better address longer term secondary fluctuations exhibited by renewable energy sources, as well as primary fluctuations. For example, the switching from charging to discharging mode can be done in relation to a day/night solar power rhythm, but it can also be triggered by extended periods of cloud cover or (in the case of wind power) by lack of wind.

Thereby the plant and process disclosed herein also address the issue that, otherwise, a conventional energy source (such as fossil fuel and/or nuclear energy based energy) should be available as a supplement to compensate for fluctuations in the availability of renewable energy. Preferably, the plant and process disclosed herein run without any supplementary energy source. Advantageously, the plant is provided as one or more modular, local, standalone units, provided only with a renewable energy source.

In accordance with this disclosure, ammonia can be produced by means of a Haber-Bosch type process, in which nitrogen and hydrogen are subjected to a catalytic reaction to form ammonia, according to the equation $2H_2+N_2 \rightarrow NH_3$.

This reaction takes place in a reactor provided with a suitable catalyst bed, in short referred to in this disclosure as a catalytic reactor. Catalysts generally are promoted iron containing catalysts, typically multi-promoted magnetite catalysts. An alternative to iron catalysts is ruthenium. The plant thus comprises (a) a catalytic reactor having a nitrogen inlet for a nitrogen feed, a hydrogen inlet for a hydrogen feed, and an ammonia outlet for produced ammonia. The ammonia synthesis generally takes place at a pressure in a range of from 70 to 350 bar, at a temperature in a range of from ambient temperature (such as 20° C.) to 600° C. Preferably the pressure is in a range of from 130 to 330 bar, with further preferred ranges being 140 to 250 bar or 280 to 320 bar. The ammonia product thus synthesized is generally depressurized and stored at about 15-17 bar. It will be understood that obtaining ammonia at atmospheric pressure will require a further lowering of the temperature, which is generally accomplished via a cold sink.

In the majority of current conventional ammonia plants, hydrogen is provided from fossil fuels such as natural gas. In deviation therefrom, the green ammonia plant of the present disclosure operates on the basis of electrolysis of water to provide hydrogen. Thus, the plant comprises (b) an electrolysis unit having a water inlet for a water feed, an oxygen outlet for oxygen, and a hydrogen outlet for hydrogen, said hydrogen outlet being in fluid communication with the hydrogen inlet of the reactor.

Suitable electrolysis cells (electrolyzers) are well-known to the skilled person. Suitable electrolyzers of substantial power (>0.1 MW) generally are bipolar electrolyzers with forced convection of the electrolyte. Typically, alkaline electrolysis cells can be used. These are operated mostly with 25-35% KOH (most manufacturers) or 14% NaOH (Hydrogen Systems water electrolyzer). The cathode reaction is catalyzed, generally with nickel, typically in the form of high surface area nickel layers, such as Rancy nickel or porous nickel coatings produced in situ by cathodic reduction of nickel sulfide coatings. Diaphragms, serving to separate off the hydrogen formed by the electrolysis, generally are made of asbestos, but more modern electrolyzers employ composite material, e.g., based on polysulfone or polytetrafluorethylene hydrophilized with finely dispersed zirconia. Suitable alternatives include nickel net-supported ceramics such as NiO or CaTIO—Ni cermets. Water electrolysis can also be conducted using cation exchange membranes, known as Solid Polymer Exchange (SPE) electrolysis. This operates on the basis of a proton-loaded water-swollen cation-exchange polymer as electrolyte. Herein metal catalysts of the platinum group are generally applied. Preferred types of electrolysis cells include alkaline cells, polymer electrolyte membrane cells. A further preferred type of electrolysis unit is a solid oxide electrolyzer cell (SOEC). This is a solid oxide fuel cell that runs in regenerative mode to achieve the electrolysis of water by using a solid oxide, or ceramic, electrolyte to produce hydrogen gas and oxygen.

The skilled person is well aware of the different types of electrolysis units, and how to operate these. The plant of the present invention is not limited to any particular type of electrolysis cells.

Nitrogen is generally provided by separating it from air. In the present disclosure any such unit is referred to, in short, as a nitrogen providing unit. Typically such a nitrogen providing unit is an air separation unit or a nitrogen generation unit. Air separation can be conducted by cryogenic distillation of liquefied gases, or by non-cryogenic techniques such as pressure swing absorption, vacuum swing absorption, or membrane separation. Thus, the plant comprises (c) a nitrogen providing unit having at least one air inlet for an air stream, an oxygen outlet for an oxygen enriched stream, and a nitrogen outlet for a nitrogen stream; said nitrogen outlet being in fluid communication with the nitrogen inlet of the reactor;

The low pressure compression and adsorber section serves to compress air to a pressure of generally 8 to 20 barg, such as 8 to 10 barg. Air is cleaned in the compressor inlet filter and is compressed typically using two-staged compressors. The outlet pressure value presents a desired optimum between typical design parameters for a nitrogen generating unit, and the maximum pressure ratio still manageable by a standard non adiabatic compressor. The air from the compressor is sent e.g. to a first Hot Storage availing of an external heat source at about 235-250° C. with adequate differential temperature, to drive sensible heat into the stored air.

The compressed air is generally passed through a $CO_2$/$H_2O$ removal stage. After the $CO_2$/$H_2O$ removal, purified air enters an after cooler. Before being sent to a process air cooler, the compressed air is further precooled in a spray cooler. Typically, wire mesh located at the top of the spray cooler acts as a water separator to free the air stream from its crude moisture components, before it enters subsequent molecular sieves adsorbers. In certain configurations, a TSA (Temperature Swing Adsorber may be envisaged in place of more standard adsorbers. Water, $CO_2$ and hydrocarbons are absorbed typically by one of two molecular sieve adsorbers. While one molecule sieve is in operation, the other one can be regenerated.

According to the invention, the plant comprises (d) a low pressure air compression and adsorber section, having an air inlet for an external air feed and an air outlet for compressed air. Said air outlet is in switchable fluid communication with either an air liquefaction section, or a high pressure air compression unit having an outlet for compressed air in fluid communication with the air liquefaction section, said air liquefaction section comprising a turboexpander configured to drive a generator to provide a first energy source. Said air outlet optionally is in fluid communication with an air inlet of the nitrogen providing unit.

The foregoing switchable fluid communication enables the plant to be operated in a mode in which LP compressed air is further compressed, and a mode in which this HP compression is bypassed, with LP compressed air being sent directly to the air liquefaction section. In the charging mode, renewable energy from an external source is available. In this mode, the plant is switched such that the LP compressed air is further compressed in the HP air compression unit. Operational pressures in this unit are generally within a range of from 50 to 200 barg, preferably 100 to 200 barg. As a result, the air liquefaction unit downstream of the HP compression unit can optimally function to establish cryogenic energy storage. In the discharging mode, the HP compression unit is bypassed. It will be understood that, as such, this reduces the energy consumption of the plant. Particularly, the configuration in the discharging mode enables effectively recovering the energy from the cryogenic energy storage, by a judicious use of the liquefied air stored from the air liquefaction section. As further discussed below, this involves using liquefied air to effectively recover energy in the generator section. The plant is configured such that, particularly when operated in the discharging mode, the amount of liquefied air sent to the nitrogen providing unit can be reduced as compared to the operation in the charging mode. In a preferred embodiment, the plant comprises a connection for air from the adsorber (in the LP compression and adsorber unit) to the nitrogen providing unit. This allows further reducing, or even entirely avoiding, the utilization of liquefied air in the nitrogen providing unit. In turn, this allows enhancing the amount of liquefied air sent to the generator section, so as to allow said section to provide a higher amount of energy made available as the second energy source.

Preferably, the plant of the present invention makes use of an industrial concept, such as used for air separation units, known as "cold box" technology. Cold boxes are self-supporting structures that protect cryogenic equipment such as brazed plate-fin heat exchangers, core-in drums, distillation columns, piping, valves and instrumentation. In the present plant, the cold box is preferably used for nitrogen generation (i.e., the nitrogen-providing unit) combined with cold storage of ammonia. Upstream of the latter a cold sink is provided, preferably also integrated in the cold box, serving to depressurize the ammonia from storage pressure (typically 15-17 barg) to atmospheric pressure.

It will be understood that clean and compressed air (either from LP compression or from HP compression) enters into the liquid air/nitrogen providing cold box. Molecular sieve adsorbers are cylindrical vessels filled with a molecular sieve packing supported between sieves at the air inlets and outlets the packing. The molecular sieve packing adsorbs the moisture carbon dioxide and hydrocarbons from the air flowing through it. As the packing has a given maximum capacity for these components it must be regenerated after a given time. Regenerating is achieved by passing a hot dry stream of gas through the bed in the opposite direction of the air flow: after regenerating the adsorber must be cooled down with cold dry gas. Purge enriched air from the cold box is reheated in a hot storage section and used for regeneration of adsorbers.

In the cold box-turbo expander liquefaction of the air is achieved, followed by distillation into a rectification column of the products (air/nitrogen) flow and purge enriched air. Cold box is a fully insulated, packaged unit, containing a plate fin heat exchanger where gas and liquid stream are parted in a number of passes, which are separated from each other by plane plates. The air is cooled down from about ambient temperature to liquefaction temperature at the same time the outgoing gas streams are warmed up almost to the temperature of the entering air. The turboexpander is designed to work nearly at isentropic expansion conditions: a radial inflow is normally able to accomplish such conditions with efficient transfer to power generation via a synchronous generator. It consists of a housing, the wheel and the generator assembled on a common shaft and the oil supply system. The cleaned air stream to be cooled, enters the turbine with pressure and drives the wheel, which is coupled with the generator. The expansion of the gas through the turbine lowers the gas temperature at outlet near to the liquefaction temperature of air.

Accordingly, the air liquefaction section comprises a turboexpander which is configured to drive a generator to provide a first energy source. This first energy source, as applicable in the charge mode, is preferably applied to supplement the renewable energy source.

At the liquid air side of the air liquefaction section, an outlet is connected with an air inlet of a liquid air storage. Such storage is provided with the necessary insulation to maintain a cold environment sufficient to keep air in a liquid state. The liquid air storage is configured as a pivotal unit for the ability of the plant to be operated in a charging and a discharging mode. To this end, the liquid air storage has a closable outlet for liquid air in fluid connection with the nitrogen providing unit. By being allowed to be closed or opened, this outlet enables the operational choice to provide liquid air to the nitrogen providing unit or not. Preferably, a fluid connection is provided between the liquid air storage and the nitrogen providing unit that is configured to adjust the amount of liquid air sent to the nitrogen providing unit. The liquid air storage further has a closable outlet for liquid air in fluid connection with a generator section. Also this connection is preferably configured to adjust the amount of liquid air sent to the generator section. It will be understood that the aforementioned closable connections can be fully separate, or can be combined. In the former case, the liquid air storage can be provided with two closable outlets, for the two respective fluid connections. In the latter case, the liquid air storage can be provided with a single outlet connected with a three-way valve or other system allowing to switch the connection from the outlet to either or both of the nitrogen providing unit and the generator section. Preferably, such switch or switchable connection is configured so as to adjust the amounts of liquid air flowing to either or both of the nitrogen providing unit and the generator section.

The generator section is configured to provide a second energy source and an expanded air stream. To this end the generator section comprises, in sequence, an evaporator with heat source, an expansion turbine mechanically connected to an electrical generator, and preferably also a further heat exchanger. The latter serves to provide the gas with a suitable temperature (typically of about 100° C.) for the regeneration of the adsorbers. The generator section optionally has an air outlet in fluid connection with an air inlet of the nitrogen providing unit. Alternatively, or in combination with the aforementioned air outlet, the generator section has an air outlet allowing expanded air from the generator section to be discharged to the atmosphere, preferably after being used to regenerate the adsorber or adsorbers as mentioned above. The generator section, upstream of the expansion, is operated generally at a pressure range of 120 to 250 bar, such as 180 to 220 bar, e.g., at 200 bar.

The plant has a power connection with a renewable energy source and with the first and second energy sources. In order for the plant to be capable of being operated in a charging mode and in a discharging mode, the plant is provided with an electrical control unit which is configured to be switchable between the renewable energy source and the first and second energy sources. This control unit thus is configured to power the plant, and to do so with an external energy source which is based on renewable energy, and with either or both of the internally provided sources of energy.

The renewable energy source is preferably selected from the group consisting of solar energy, wind energy, hydro energy, tidal energy, geothermal energy, biomass energy, and combinations thereof. Hereof particularly solar energy and wind energy are prone to strong fluctuations, such as caused by day and night in the event of solar energy and as caused by weather changes in the event of both solar energy and wind energy. In order to optimally benefit from the judicious configuration of the plant disclosed herein, the renewable energy source is preferably solar energy, wind energy, or a combination thereof.

In addition to being configured to cope with fluctuations in power from a renewable source energy, the plant is preferably also configured to thereby take into account heat management, preferably an improved heat management.

To this end, the plant preferably comprises a heat storage unit which is configured to receive heat from various units, as provided by the associated process steps. These units include the catalytic reactor, the low pressure air compression and adsorber section, and the high pressure air compression unit. The heat storage unit is configured to provide heat to the generator section, i.e., the section that serves as an additional internal energy source during operation of the plant in the discharging mode.

The working of the plant in charging and discharging operation will be explained hereinafter with reference to the processes for which the plant is configured to be operated.

In broad terms, the present process is conducted as a substantially continuous process for the production of ammonia. This process is carried out in a charging mode at times when a renewable energy source is abundant and in a discharging mode at other times.

During the charging mode, air is compressed in a LP stage (preferably to about 10 barg) and the heat produced is preferably stored in a heat storage unit. The heat storage unit also stores heat from the reaction of nitrogen and hydrogen to form ammonia. The LP air is passed through an adsorber to a HP compression stage where the air is compressed, preferably to about 150 barg, cooled, converted to liquid air for storage in a storage tank. Liquid air is then fed to the nitrogen providing unit, typically an air separation unit (ASU) or a nitrogen generation unit (NGU), to provide a nitrogen stream sufficient for full operation of the ammonia synthesis reactor. In this mode the electrolysis unit is operated from the renewable energy source to provide the required hydrogen stream. In an alternative embodiment, air for the ASU or NGU is drawn from the adsorber output rather than as liquid air from storage.

During the discharging mode, the ammonia synthesis reactor is operated at a lower rate. This will generally be a turndown to about 30% to 90%, such as 40% to 80%, such as 50% to 70% of the charging mode. This enables the nitrogen providing unit (such as the ASU or NGU) and the electrolysis unit to also operate at lower rates. The reduced rate of the nitrogen providing unit corresponds to a lower requirement for liquid air for this unit. This permits the HP compression stage to be bypassed. A lesser amount of liquid air is drawn from the liquid air tank sufficient to supply the lower nitrogen requirement of the ASU/NGU. A larger amount of liquid air is drawn from the storage tank, compressed and heated, and expanded over a generator. The pressure thereby is generally in a range of from about 100 barg to about 250 barg, such as 180 barg to 220 barg, e.g., 200 barg. The temperature is generally in a range of from about 250° C. to about 650° C., such as 500° C. to 600° C., e.g. 550° C. Higher pressures and temperatures come with the advantage of a corresponding higher power output.

The generator provides the electricity to operate the process during the discharge mode including operating the electrolysis unit. In an alternative embodiment, the air supply to the ASU/NGU is provided from the expanded air rather than from liquid air, as discussed above with reference to the possible connection for air from the LP compression and adsorber section, to the nitrogen providing section.

Optionally, the expanded air is used to regenerate the adsorber (e.g. two columns are operated in parallel, one operational and one undergoing regeneration, and are alternated).

Thus, in the charging mode, the process comprises operating the electrolysis unit with energy from the renewable energy source to provide the hydrogen. Preferably, the process thereby also comprises storing heat from compressing air in the low pressure air compression and adsorber section and from reacting the nitrogen and hydrogen in the catalytic reactor, in the heat storage unit.

In the discharging mode, LP compressed air is sent to the air liquefaction section. In this mode, air is fed from the liquid air storage to the generator section, thereby expanding the air so as to provide a second energy source and expanded air. This expanded air, possibly in addition to air from the liquefied air storage is fed to the nitrogen providing unit. Hereby the process comprises adapting the operating rate of the nitrogen providing unit, the electrolysis unit, and the catalytic reactor to in accordance with the amount of air available for the nitrogen providing unit. The discharging mode involves operating the control unit so as to power the process by the first and second energy sources.

It will be understood that a variety of combined power sources can be applied. E.g., it is conceivable that also in the discharging mode some energy from a renewable outside energy source is available, in addition to the energy provided from the generator section. The skilled person will be able to adjust the operation of the plant accordingly. E.g., by having a less reduced rate of operation in the nitrogen providing unit (and, accordingly, the other chemical process units).

As described before, in a further aspect the invention can also be applied in a method of modifying a pre-existing plant for the production of ammonia (i.e., a revamp method). Pre-existing ammonia plants will generally be "grey" ammonia plants, operating on the basis of hydrogen produced from hydrocarbons. Typically, therefore a pre-existing ammonia plant will comprise the corresponding sections, including for sulphur removal, catalytic shift conversion, carbon dioxide removal, and catalytic methanation. Whether or not such sections would remain operational as an alternative source of hydrogen in such plant, the revamp method of the present invention will serve to add a water electrolysis unit as described hereinbefore, as well as the low pressure air compression and adsorber section, the liquid air storage, all being configured as described before. It will be understood that the revamp method requires arranging that the plant has a power connection with a renewable energy source, as well as with the first and second energy sources described above, and configuring the electrical control unit such as to be switchable between the renewable energy source and the first and second energy sources, including combinations thereof. The method preferably comprises adding any units and/or connections to the pre-existing plant that allow the modernization to result in a plant as described hereinbefore in any of its embodiments.

Preferably, the plant of the invention is built as a new, grassroots, plant. In fact, an advantage of the present plant is that it requires much less chemical conversion technology than 'grey' ammonia plants. As a result, it can be built, in a great variety of desired scales, on a great variety of locations.

In sum, the disclosure pertains to a plant for the production of ammonia. The ammonia is produced from hydrogen obtained by electrolysis of water. The electrolysis is powered by a renewable source of energy, complemented with power obtained from the plant during periods of low or no availability of the renewable energy. To this end, the plant is configured such that it can be operated in a charge configuration (obtaining and storing power) and a discharge configuration (employing said power).

The invention is hereinafter further illustrated with reference to the non-limiting drawings discussed hereinafter. The units and streams as shown in the drawings are general representations. In addition, by way of example of how to carry out the invention, specific numbers are given below for possible amounts, pressures and temperatures at various stages. The disclosure of the embodiments of the plant and process of the invention is expressly not limited by said specific numbers.

Figure 1:
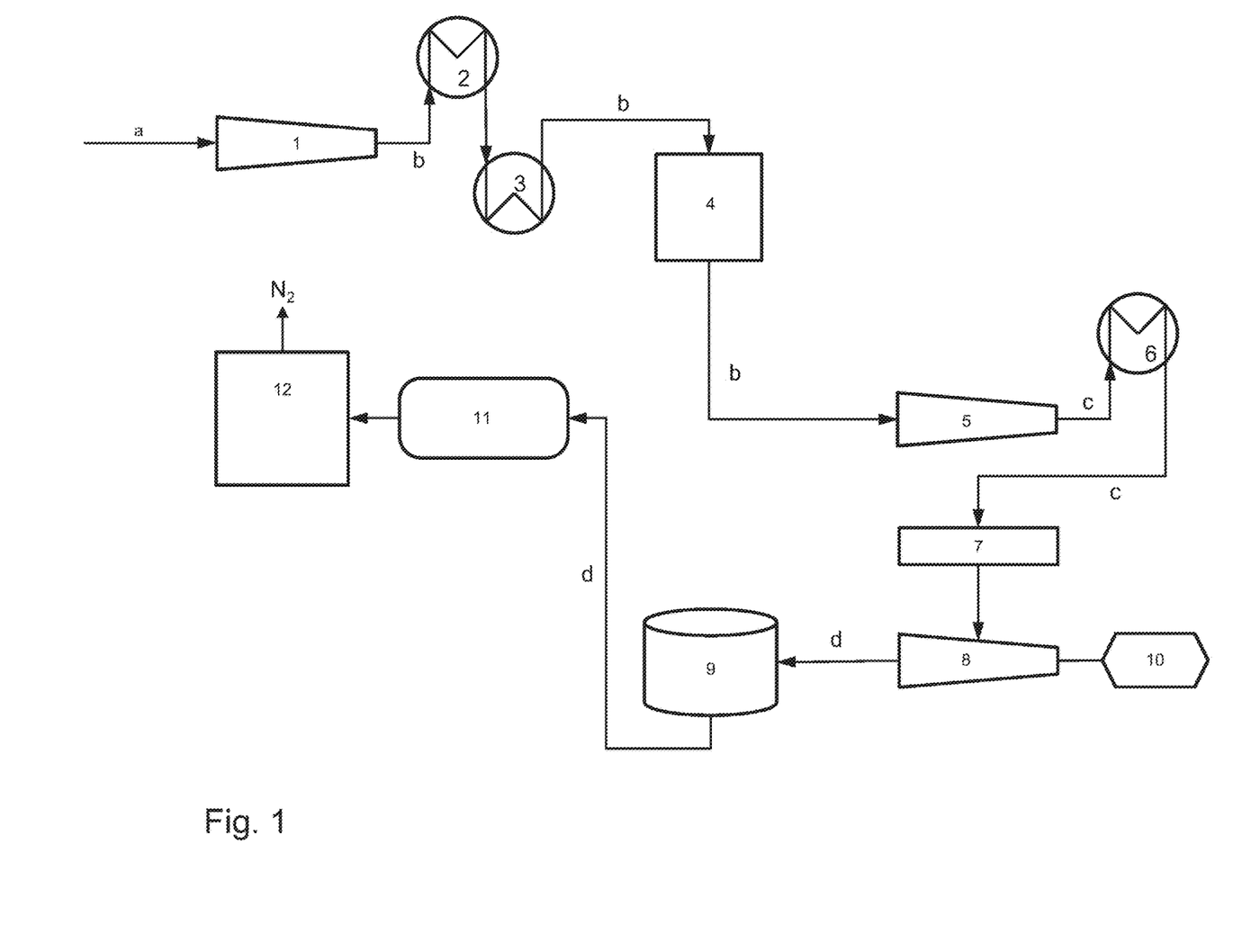
FIG. 1 schematically shows parts of a plant according to the invention, in order to illustrate a charge configuration.

FIG. 1 is a schematic drawing illustrating a charge mode configuration applied to a plant of the invention. Air (stream (a), total air inlet 215000 $Nm^3/h$) is compressed to 10 bar at 170° C. in an LP compressor (1); via heating to 230° C. in a first heat exchanger (2) and cooling to 60-80° C. in a second heat exchanger (3), the LP compressed air (b) is led via an adsorber section (4) to a HP compressor (5), in which the air is compressed to 150 bar at 550° C. In a heat exchanger (6) the HP compressed air (c) is cooled to 100° C. and sent to a cold box section (7). In a downstream turboexpander (8)—which optionally is included in the cold box section—the air is liquefied and sent (stream (d); 215000 $Nm^3/h$) to a liquid air storage tank (9); the turboexpander is configured to drive a generator (10), which provides a first energy source producing 2-4 MW. Liquid air (d) from the storage tank (9) is connected via a pump (11), typically a cryopump, to a nitrogen providing unit (12), at a rate of 8.74 t/h, resulting in a nitrogen production of 2810 $Nm^3/h$. The charge mode as depicted is typically operated for a period of 12 hours.

Figure 2:
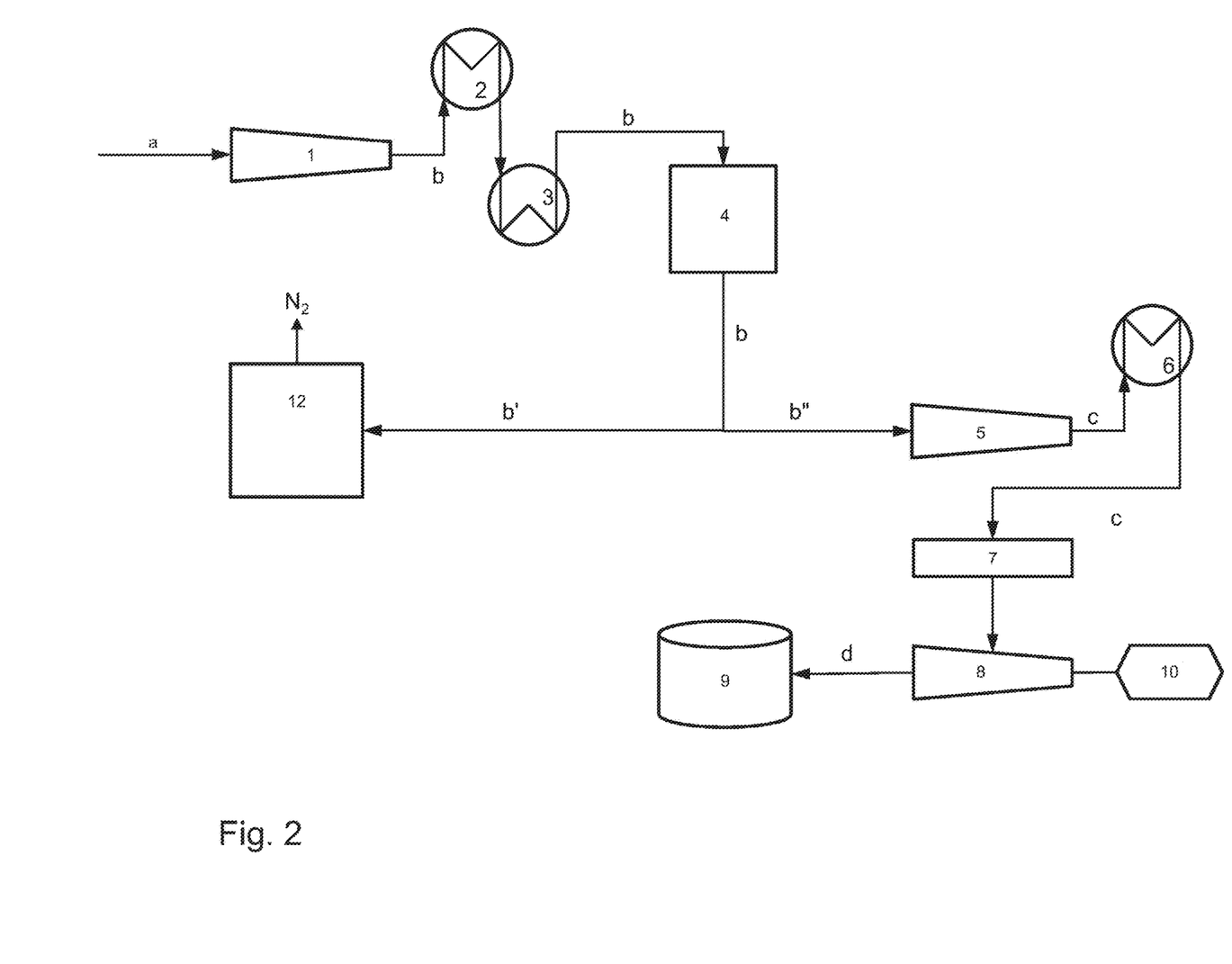
FIG. 2 schematically shows parts of a plant according to the invention, in order to illustrate an alternative charge configuration.
Figure 3:
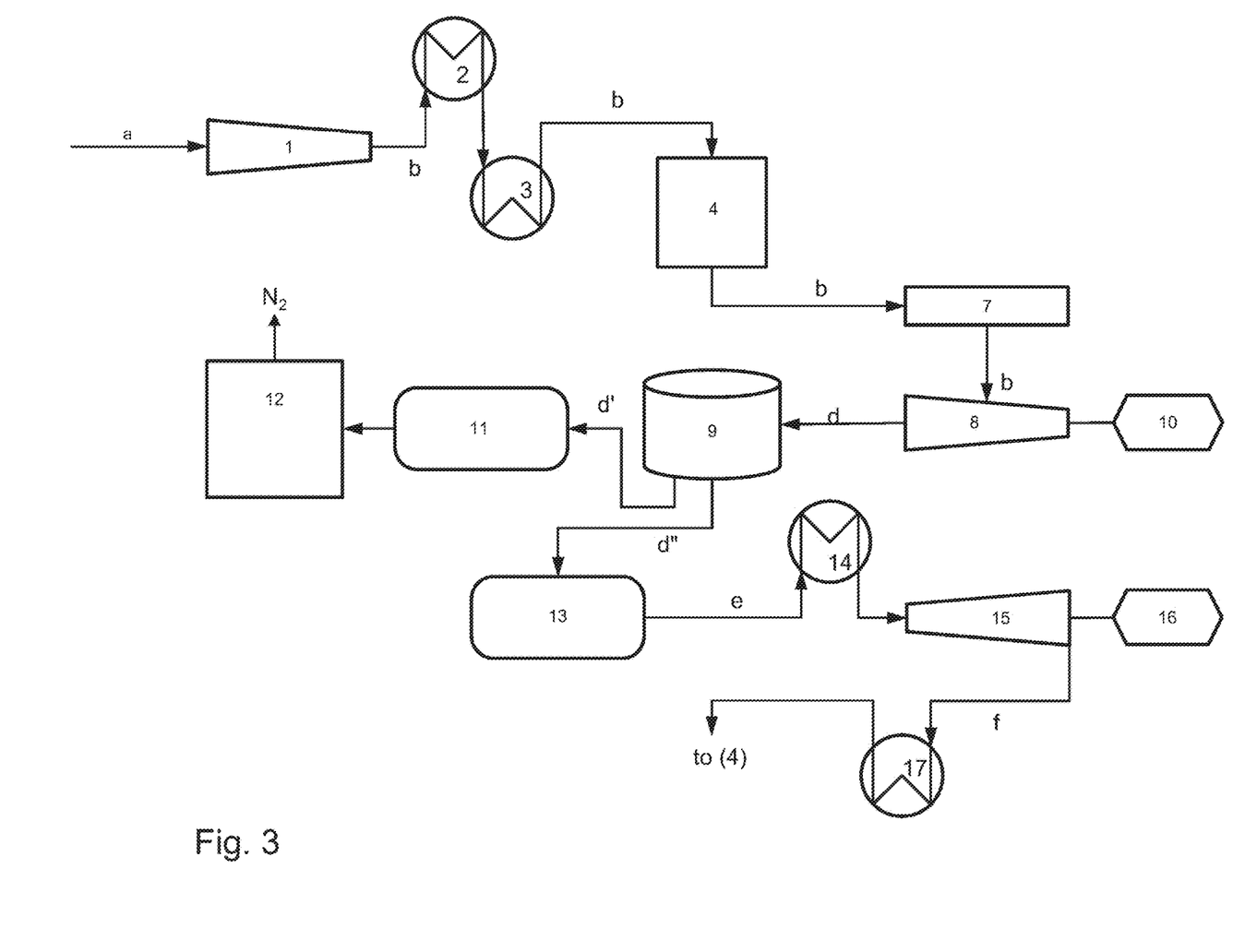
FIG. 3 schematically shows parts of a plant according to the invention, in order to illustrate a discharge configuration.

FIG. 2 is a schematic drawing illustrating an alternative charge mode configuration applied to a plant of the invention. Air (stream (a), total air inlet 222000 $Nm^3/h$) is compressed to 10 bar at 170° C. in an LP compressor (1); via heating to 230° C. in a first heat exchanger (2) and cooling to 60-80° C. in a second heat exchanger (3), the LP compressed air (b) is led through an adsorber section (4). Therefrom, part of the LP compressed air at 9.5 barg and 40° C. (stream (b'), 7000 $Nm^3/h$) is sent to a nitrogen providing unit (12), resulting in a nitrogen production of 2810 $Nm^3/h$. The remaining portion of the LP compressed air (b") is sent to a HP compressor (5), in which the air is compressed to 150 bar at 550° C. In a heat exchanger (6) the HP compressed air (c) is cooled to 100° C. and sent to a cold box section (7). In a downstream turboexpander (8) the air is liquefied and sent (stream (d); 215000 $Nm^3/h$) to a liquid air storage tank (9); the turboexpander is configured to drive a generator (10), which provides a first energy source producing 2-4 MW. The charge mode as depicted is typically operated for a period of 12 hours. FIG. 3 is a schematic drawing illustrating a discharge mode configuration applied to a plant of the invention. Air (stream (a), total air inlet 5000 $Nm^3/h$) is compressed to 10 bar at 170° C. in an LP compressor (1); via heating to 230° C. in a first heat exchanger (2) and cooling to 60-80° C. in a second heat exchanger (3), the LP compressed air (b) is led via an adsorber section (4) to a cold box section (7). In a downstream turboexpander (8) the air is liquefied and sent (stream (d); 215000 $Nm^3/h$) to a liquid air storage tank (9); the turboexpander is configured to drive a generator (10), which provides a first energy source. A first stream of liquid air (d') from the storage tank (9) is connected via a pump (11) to a nitrogen providing unit (12), at a rate of 8.74 t/h, resulting in a nitrogen production of 2810 $Nm^3/h$. A second stream of liquid air (d") is sent, at a rate of 250 t/h to a further compressor (13) and compressed, with heating via heat exchanger (14). The resulting compressed air (stream (c) at 200 bar and 550° C.) is sent to a generator section (15). This section produces an expanded air stream (f) which is brought to a temperature of 100° C. by means of a heat exchanger (17) and is used for regeneration of the adsorber or adsorbers in the adsorber section (4) and vented into the atmosphere (not shown). The generator section is configured to drive a generator (16), which provides a second energy source producing 44 MW. The discharge mode as depicted is typically operated for a period of 12 hours.

Figure 4:
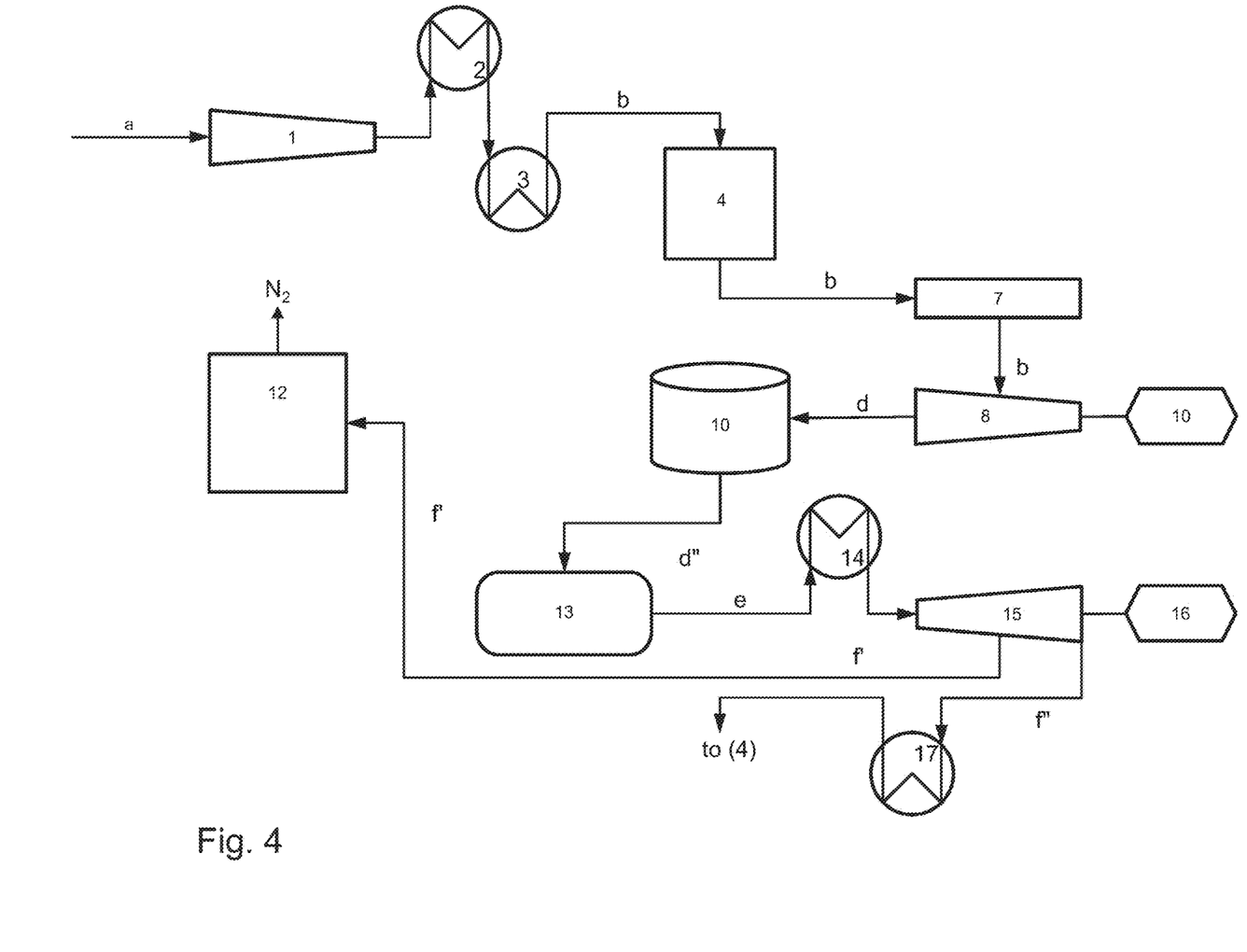
FIG. 4 schematically shows parts of a plant according to the invention, in order to illustrate an alternative discharge configuration.

FIG. 4 is a schematic drawing illustrating an alternative discharge mode configuration applied to a plant of the invention. Air (stream (a), total air inlet 5000 $Nm^3/h$) is compressed to 10 bar at 170° C. in an LP compressor (1); via heating to 230° C. in a first heat exchanger (2) and cooling to 60-80° C. in a second heat exchanger (3), the LP compressed air (b) is led via an adsorber section (4) to a cold box section (7). In a downstream turboexpander (8) the air is liquefied and sent (stream (d); 215000 $Nm^3/h$) to a liquid air storage tank (9); Air is extracted from the storage tank, whereby a stream of liquid air (d") is sent, at a rate of 250 t/h to a further pump (13) and pressurized, with heating via heat exchanger (14). The resulting compressed air (stream (c) at 200 bar and 550° C.) is sent to a generator section (15). This section produces an expanded air stream, part of which (stream (f') of 5000 $Nm^3/h$ at 9.5 bar and 40° C.) is sent to the nitrogen providing unit (12), resulting in a nitrogen production of 2000 $Nm^3/h$. Another part of the expanded air stream (f") is brought to a temperature of 100° C. by means of a heat exchanger (17) and is used for regeneration of adsorbers (18) and vented into the atmosphere. The generator section is configured to drive a generator (16), which provides a second energy source producing 44 MW. The discharge mode as depicted is typically operated for a period of 12 hours.

Figure 5:
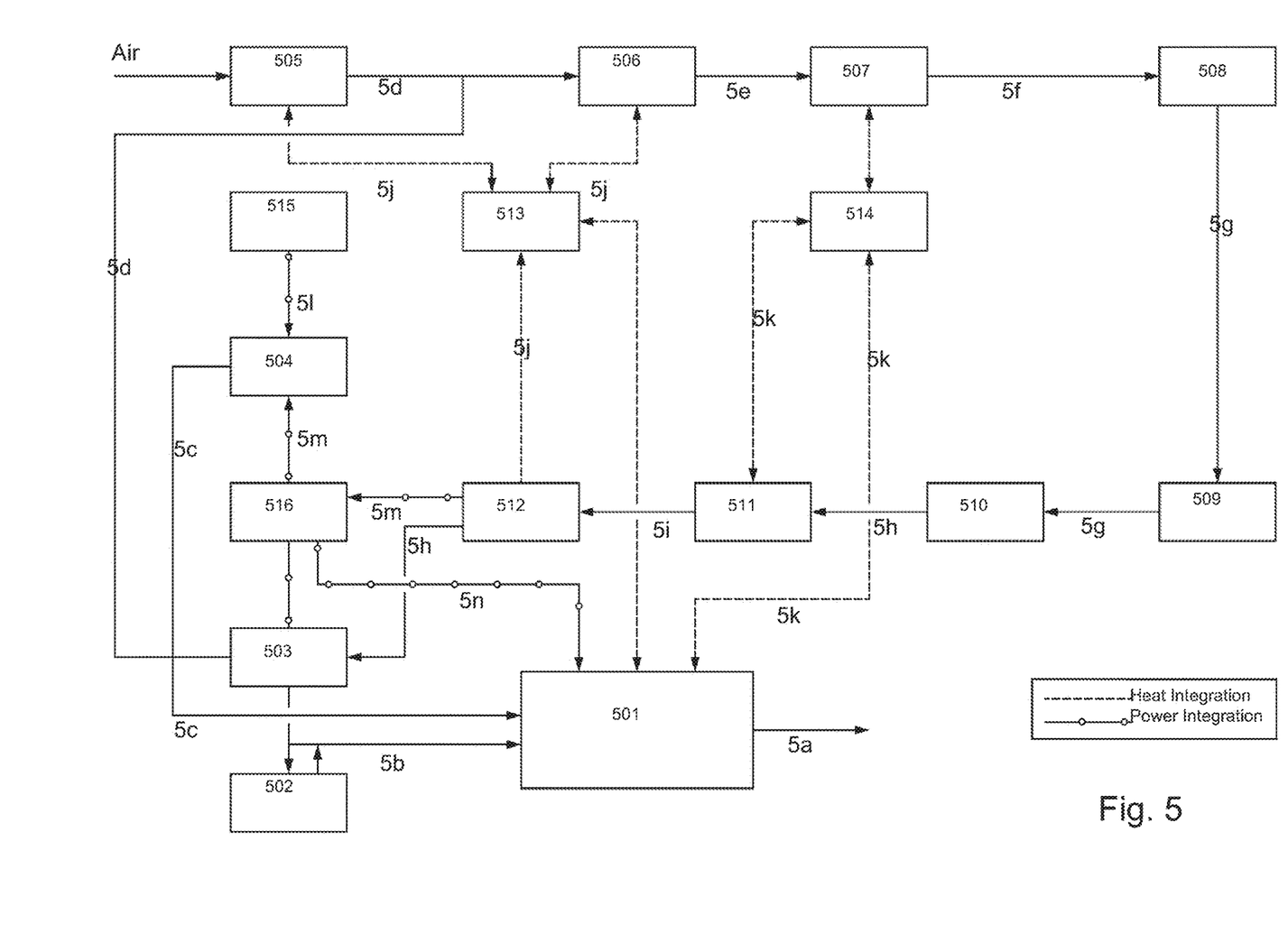
FIG. 5 shows a scheme depicting an embodiment of a plant according to the invention, indicating process, thermal, and power connections.

FIG. 5 schematically represents an ammonia plant of the invention. The ammonia synthesis streams are depicted as solid lines. Accordingly, ammonia is produced and stored in an ammonia synthesis and product storage section (501) from which an ammonia product stream (5a) can be obtained. The ammonia production and storage section comprises a reactor (not shown) to which nitrogen and hydrogen can be fed. In the process the nitrogen (5b) can be obtained from either or both of a liquid nitrogen storage unit (502) or a nitrogen providing unit (503), which are both connected with the ammonia synthesis and product storage section (501). The hydrogen (5c) is produced from water (input not shown) in an electrolysis unit (504) which is connected with the ammonia synthesis and product storage section (501). The plant further has an inlet for air, which is subjected to low pressure compression in an LP compression unit (505). The LP compression unit (505) has a switchable connection with a HP compression unit (506), allowing LP compressed air (5d) to be further compressed to obtain HP compressed air (5c). The HP compression unit (506) is connected with an air liquefaction section comprising a refrigeration unit (507) connected with a turboexpander (508), thereby allowing cooled HP air (5f) to be expanded, thereby generating power (not shown) and liquid air (5g). The turboexpander (508) has a connection for liquid air (5g) with a liquid air storage unit (509). The liquid air storage unit (509) has a closable connection (other optional connections not shown) for liquid air (5g) with a generator section comprising a liquid air compression unit (510) connected with an evaporation unit (511) which is further connected with a turboexpander (512), thereby allowing liquid air (5g) obtained from the liquid air storage unit (509) to be compressed into compressed liquid air (5h), at 200 bar pressure, and to be evaporated so as result in an air stream (5i) which is subjected to expansion in said turboexpander (512). Accordingly, an air stream (5h) can be sent to the nitrogen providing unit (503) which has a switchable connection with the generator section, i.e., with the turboexpander (512). The nitrogen providing unit (503) also has a switchable connection at a downstream side of the LP compression unit (505), allowing LP compressed air (5d) to be sent to the nitrogen providing unit (503).

The figure further shows thermal connections (5j) and (5k), and power connections (5l), (5m), and (5n).

Accordingly, the plant comprises a hot storage section (513), which is in thermal communication with the LP compression unit (505), the HP compression unit (506), and the turboexpander unit (512) of the generator section, allowing heat exchange (5j) with any one or more of these units. The plant further comprises a cold storage section (514), which is in thermal communication with any one or more of the refrigeration unit (507), the evaporation unit (511), and the ammonia synthesis and product storage section (501). This thermal communication is cryogenic, and is preferably all encompassed in a cold box section. Thereby cryogenic temperatures are maintained for cold streams (5k) between a cold sink from the ammonia synthesis and product storage section (501), the liquid air evaporation unit (511), and said cold storage section (515).

The power connections as shown relate to power generated by the process conducted in the plant, and power from renewable energy. Accordingly, a renewable energy unit (515) provides power (5l) to the electrolysis unit (504). The latter unit also possibly receives power (5m) from the generator section. The power output from the plant can be managed by a power output unit (516), and possibly is also used to power the ammonia synthesis and product storage section (501).

The invention claimed is:

1. A plant for the production of ammonia, said plant comprising:
 (a) a catalytic reactor having a nitrogen inlet for a nitrogen feed, a hydrogen inlet for a hydrogen feed, and an ammonia outlet for produced ammonia;
 (b) an electrolysis unit having a water inlet for a water feed, an oxygen outlet for oxygen, and a hydrogen outlet for hydrogen, said hydrogen outlet being in fluid communication with the hydrogen inlet of the reactor;
 (c) a nitrogen providing unit having at least one air inlet for an air stream, an oxygen outlet for an oxygen enriched stream, and a nitrogen outlet for a nitrogen stream; said nitrogen outlet being in fluid communication with the nitrogen inlet of the reactor;
 (d) a low pressure air compression and adsorber section, having an air inlet for an external air feed and an air outlet for LP compressed air, said air outlet being optionally in fluid communication with an air inlet of the nitrogen providing unit and being in switchable fluid communication with either an air liquefaction section, or a high pressure air compression unit having an outlet for compressed air in fluid communication with the air liquefaction section, said air liquefaction section comprising a turboexpander configured to drive a generator to provide a first energy source;
 (e) a liquid air storage having a liquid air inlet for liquid air obtained from the air liquefaction section, a closable outlet for liquid air in fluid connection with the nitrogen providing unit, and a closable outlet for liquid air in fluid connection with a generator section configured to provide a second energy source and an expanded air stream;
 (f) an electrical control unit configured to power the plant; wherein the plant has a power connection with a renewable energy source and with the first and second energy sources, and wherein the electrical control unit is configured to be switchable between the renewable energy source and the first and second energy sources, including combinations thereof.

2. The plant according to claim 1, further comprising:
 (g) a heat storage unit which is configured to receive heat from a heat producing unit selected from the group consisting of the catalytic reactor, the low pressure air compression and adsorber section, the high pressure air compression unit, and combinations thereof, said heat storage unit being configured to provide heat to the generator section.

3. The plant according to claim 1, wherein the renewable energy source is selected from the group consisting of solar energy, wind energy, hydro energy, tidal energy, geothermal energy, biomass energy, and combinations thereof.

4. The plant according to claim 3, wherein the renewable energy source is solar energy, wind energy, or a combination thereof.

5. The plant according to claim 4, wherein the renewable energy is exclusively solar energy.

6. The plant according to claim 5, wherein the air outlet for LP compressed air is in fluid communication with an air inlet of the nitrogen providing unit.

7. The plant according to claim 1, wherein the generator section has an air outlet in fluid connection with an air inlet of the nitrogen providing unit.

8. A process for the production of ammonia, the process being conducted in a plant according to claim 1, comprising the steps of:
 (i) obtaining at least part of the nitrogen from the nitrogen providing unit;
 (ii) obtaining at least part of the hydrogen from the electrolysis unit;
 (iii) reacting the nitrogen and the hydrogen in the catalytic reactor under ammonia-forming conditions;
the process comprising operating the plant in a charging mode, said charging mode comprising compressing air in the low pressure air compression and adsorber section to provide LP compressed air; compressing the LP compressed air in the high pressure air compression unit to provide HP compressed air, subjecting the HP compressed air to expansion and liquefaction in the turboexpander so as to obtain liquefied air; storing the liquefied air in the liquid air storage; feeding air from the liquid air storage and/or feeding air from the low pressure air compression and adsorber section to the nitrogen providing unit;

wherein the process comprises operating the electrolysis unit with energy from the renewable energy source to provide the hydrogen.

9. The process according to claim 8, comprising storing heat from compressing air in the low pressure air compression and adsorber section and from reacting the nitrogen and hydrogen in the catalytic reactor, in a heat storage unit.

10. A process for the production of ammonia, the process being conducted in a plant as described in claim 1, comprising the steps of:
   (i) obtaining at least part of the nitrogen from the nitrogen providing unit;
   (ii) obtaining at least part of the hydrogen from the electrolysis unit;
   (iii) reacting the nitrogen and the hydrogen in the catalytic reactor under ammonia-forming conditions;
the process comprising operating the plant in a discharging mode, said discharging mode comprising compressing air in the low pressure air compression and adsorber section to provide LP compressed air; sending the LP compressed air to the air liquefaction section; subjecting the LP compressed air to expansion and liquefaction in the turboexpander so as to obtain liquefied air; said turboexpander providing a first energy source; storing the liquefied air in the liquid air storage; feeding air from the liquid air storage to the generator section, thereby expanding the air so as to provide a second energy source and expanded air, feeding the nitrogen providing unit with air from either or both of the liquid air storage and the expanded air, wherein the process comprises adapting the operating rate of the nitrogen providing unit, the electrolysis unit, and the catalytic reactor to in accordance with the amount of air available for the nitrogen providing unit, and operating the control unit so as to power the process by the first and second energy sources.

11. The process according to claim 10, comprising using heat from a heat storage unit which is configured to receive heat from a heat producing unit selected from the group consisting of the catalytic reactor, the low pressure air compression and adsorber section, the high pressure air compression unit, and combinations thereof, the process comprising using heat from said heat storage unit to heat the air in the generator section.

12. A method of modifying a pre-existing plant for the production of ammonia, said pre-existing plant comprising:
   a catalytic reactor having a nitrogen inlet for a nitrogen feed, a hydrogen inlet for a hydrogen feed, and an ammonia outlet for produced ammonia;
   a hydrogen providing section having a hydrogen outlet for hydrogen, said hydrogen outlet being in fluid communication with the hydrogen inlet of the reactor;
   a nitrogen providing unit having at least one air inlet for an air stream, an oxygen outlet for an oxygen enriched stream, and a nitrogen outlet for a nitrogen stream; said nitrogen outlet being in fluid communication with the nitrogen inlet of the reactor;
   an electrical control unit configured to power the plant;
the method comprising adding to the pre-existing plant:
   an electrolysis unit having a water inlet for a water feed, an oxygen outlet for oxygen, and a hydrogen outlet for hydrogen, said hydrogen outlet being in fluid communication with the hydrogen inlet of the reactor;
   a low pressure air compression and adsorber section, having an air inlet for an external air feed and an air outlet for LP compressed air, said air outlet being optionally in fluid communication with an air inlet of the nitrogen providing unit and being in switchable fluid communication with either an air liquefaction section, or a high pressure air compression unit having an outlet for compressed air in fluid communication with the air liquefaction section, said air liquefaction section comprising a turboexpander configured to drive a generator to provide a first energy source;
   a liquid air storage having a liquid air inlet for liquid air obtained from the air liquefaction section, a closable outlet for liquid air in fluid connection with the nitrogen providing unit, and a closable outlet for liquid air in fluid connection with a generator section configured to provide a second energy source and an expanded air stream; said generator section having an air outlet in fluid connection with an air inlet of the nitrogen providing unit;
and arranging that the plant has a power connection with a renewable energy source and with the first and second energy sources, and configuring the electrical control unit such as to be switchable between the renewable energy source and the first and second energy sources, including combinations thereof.

13. The method according to claim 12, further comprising adding to the pre-existing plant a heat storage unit which is configured to receive heat from a heat producing unit selected from the group consisting of the catalytic reactor, the low pressure air compression and adsorber section, the high pressure air compression unit, and combinations thereof, said heat storage unit being configured to provide heat to the generator section.

14. The method according to claim 12, comprising adding a connection for fluid communication between the air outlet for LP compressed air with an air inlet of the nitrogen providing unit.

15. The method according to claim 12, comprising adding a connection for fluid communication between an air outlet of the generator section with an air inlet of the nitrogen providing unit.

* * * * *